United States Patent [19]
Anderson

[11] 3,841,664
[45] Oct. 15, 1974

[54] TRAILER HITCH GUARD

[76] Inventor: John H. Anderson, P.O. Box 254, Prior Lake, Minn. 55372

[22] Filed: Mar. 8, 1973

[21] Appl. No.: 339,295

[52] U.S. Cl. .............................................. 280/507
[51] Int. Cl. .............................................. B60d 1/06
[58] Field of Search .................... 280/507, 477, 511

[56] References Cited
UNITED STATES PATENTS

| | | | |
|---|---|---|---|
| 3,012,797 | 12/1961 | Manting | 280/507 |
| 3,522,958 | 8/1970 | Lusignan | 280/507 |

Primary Examiner—Robert R. Song
Attorney, Agent, or Firm—Douglas L. Carlsen; Andrew E. Carlsen

[57] ABSTRACT

A guard for shielding a trailer hitch ball to prevent the front bumper of one vehicle from jumping over such a hitch ball mounted on a draft bar extending rearwardly from another vehicle comprising a U-shaped member having the central portion secured to the draft bar with the legs thereof forming guard plates extending upwardly on each side of the ball, the member being secured to the bar by a U-bolt straddling the bar and extending through said central portion and the guard plates being configured to allow relatively free lateral swinging of a trailer tongue hitched to the ball.

4 Claims, 4 Drawing Figures

PATENTED OCT 15 1974　　3,841,664
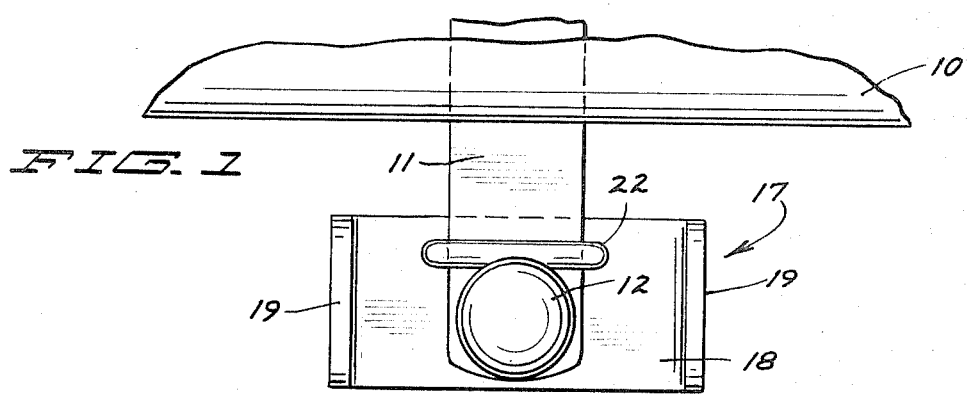
FIG.1
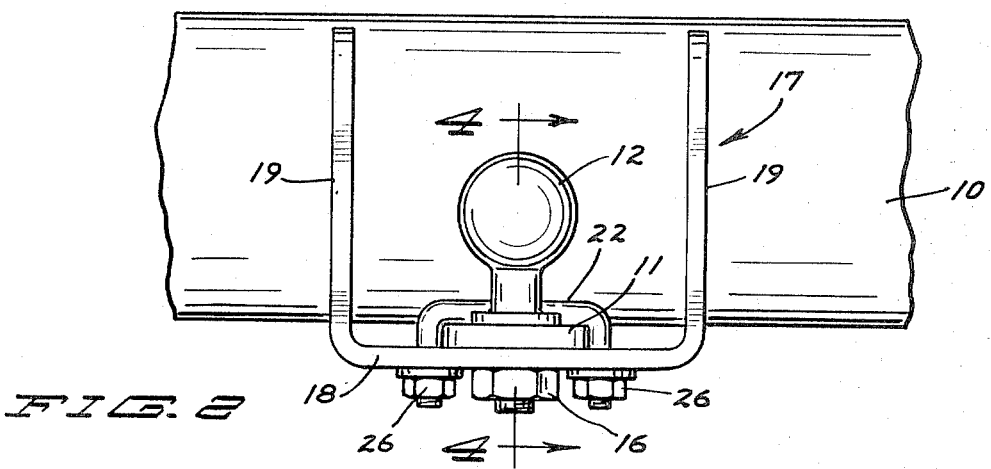
FIG.2
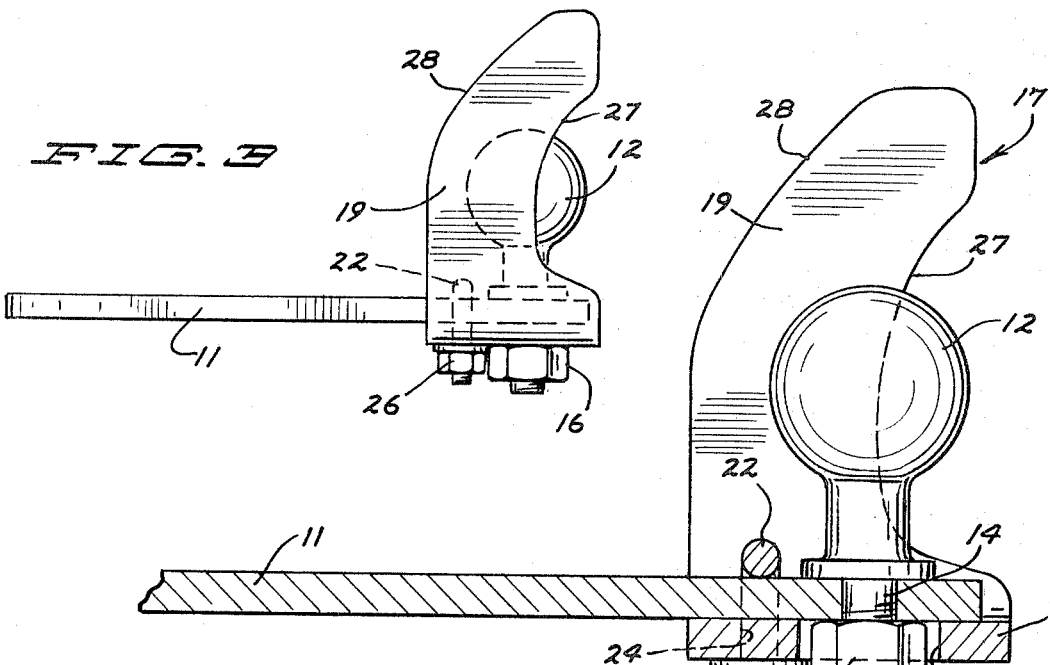
FIG.3
FIG.4

TRAILER HITCH GUARD

BACKGROUND OF THE INVENTION

Vehicles which are frequently used to pull trailers are generally equipped with a permanent trailer hitch which extends rearwardly from the central portion of the frame or rear bumper. The hitch comprises a draft bar with a ball mounted in upright position thereon to seat or be received in a downwardly opening cup mounted on the forward end of a trailer tongue.

During periods when there is no trailer connected to the draft vehicle the hitch ball is normally left mounted on the vehicle and protrudes in a position where it interferes with normal bumper contact between the draft vehicle and another vehicle approaching from or parked to the rear thereof. When two such vehicles collide, even at very low speed which would normally not cause damage to either vehicle, the front bumper of the rear vehicle will, upon engaging the hitch ball, slide upwardly thereover causing damage to the rear body portions of the vehicle carrying the hitch and the front body and grille portions of the colliding vehicle.

To prevent or minimize such damage various protective devices or guards have been provided. Perhaps the closest device to the present invention is shown in U.S. Pat. No. 3,012,797, issued Dec. 12, 1961 to Manting. Other hitch ball guards or covers are shown in the art but generally require some sort of mechanical conversion between a use and nonuse position. Where the device must be so moved there is not only the danger that it will inadvertently be bumped into the wrong position but also that it may rust or corrode so as to be immovable between positions when desired.

SUMMARY OF THE INVENTION

The object of the present invention is to provide a trailer hitch guard which can be readily and simply mounted on a draft bar and which will, without conversion between positions, shield the hitch ball when not in use and yet allow free lateral swinging movement of a trailer tongue attached thereto.

With this and other objects in view the present invention broadly comprises a U-shaped guard having a central bight portion adapted to be secured crosswise to a trailer draft bar with the legs thereof forming guard plates extending upwardly at opposite sides of a hitch ball mounted on the draft bar, the central bight portion having an aperture for receiving a nut or the like which secures the ball to the bar and means for securing the bight portion of the guard to the draft bar.

BRIEF DESCRIPTION OF THE DRAWING

In the drawing:

FIG. 1 is a plan view of the guard mounted on a conventional trailer hitch draft bar.

FIG. 2 is a rear elevation of the guard mounted on the draft bar.

FIG. 3 is a side elevation of the guard and draft bar.

FIG. 4 is an enlarged longitudinal vertical section taken on line 4—4 of FIG. 2.

DESCRIPTION OF THE PREFERRED EMBODIMENT

Referring now more particularly to the drawings reference characters will be used to denote like parts or structural features in the different views. An automobile has a conventional rear bumper 10. A draft bar 11 is mounted on the vehicle frame or bumper 10 to extend rearwardly beyond the bumper and support a conventional trailer hitch ball 12 which is mounted in upright position on the rear end portion of the bar. The ball 12 has a stem 14 which extends downwardly through an aperture in bar 11 and the lower end portion of the stem is threaded as at 15 to receive the nut 16 which tightly secures the ball to the bar. The trailer hitch thus described is of conventional construction.

The guard forming the subject matter of the present invention is denoted generally by the number 17. It has a U-shape with a horizontal bight portion 18 connecting a pair of upstanding guard plates 19 disposed on substantially parallel planes. The member 17 is preferably formed of a single plate of heavy steel bent to the shape described. The bight portion 18 is provided with a large aperture 20 having a diameter somewhat larger than that of the nut 16 so that the portion 18 may be placed in flush engagement against the underside of the bar 11 with the nut disposed within the aperture 20, as shown in FIG. 4.

The member 17 is secured to the bar 11 by means of a U-bolt 22 which extends downwardly in straddling relation over the bar with the legs thereof extending through apertures 24 in the bight portion 18. The lower end portions of the bolt legs are threaded as at 25 to receive the nuts 26.

The shape of the plates 19 is a significant feature of this invention. First, it will be observed that the plates extend upwardly somewhat beyond the top surface of the ball 12 when the guard is mounted. Also, the rear edge 27 of each of the plates 19 is provided with a concave curve the center of which is horizontally aligned with the center of the ball 12. This is to provide increased lateral swinging clearance for a trailer tongue which may be hitched to the ball 12. The front edges of the plates 19 angle rearwardly as at 28 in their upward extension. This is to allow use of the guard on passenger vehicles having a central gasoline tank spout covered by a plate hinged along its lower edge.

It will be understood that when the guard 17 is mounted on the draft bar 11 as shown in the drawing, and without a trailer tongue hitched to the ball 12, the guard will provide a protective shield around the ball reducing damage to both the draft vehicle and a vehicle colliding therewith from the rear. Upon such a collision the guard plates 19 will be engaged by the front bumper of the colliding vehicle and said plates will prevent the colliding bumper from sliding over the ball 12 to limit body damage and prevent interlocking of the two vehicles.

It is significant that the member 17 is provided with the aperture 20 as this enables the guard to be readily and securely mounted on the draft bar without removing the hitch ball 12. This simplifies mounting of the guard as frequently the nut 16 is rusted on the stem 15. It will also be noted that the U-bolt 22 enables mounting of the guard without any modification of the draft bar 11.

Having now therefore fully illustrated and described my invention, what I claim to be new and desire to protect by United States Letters Patent is:

1. A guard for shielding a trailer hitch ball mounted in upright position on a draft bar at the rear of a draft vehicle comprising, a U-shaped member having a horizontal bight portion connecting a pair of upright guard plates, means for integrally securing the bight portion to the draft bar with the guard plates disposed one on each side of the hitch ball and extending upwardly beyond the top of the hitch ball, the said securing means being independent of the mounting of the hitch ball on the draft bar, and the rear edges of the guard plates being concavely curved to provide swinging clearance for a trailer tongue connected to the hitch ball.

2. A guard for shielding a trailer hitch ball mounted in upright position on a draft bar at the rear of a draft vehicle comprising, a U-shaped member having a horizontal bight portion connecting a pair of upright guard plates, means for integrally securing the bight portion to the draft bar with the guard plates disposed one on each side of the hitch ball and extending upwardly beyond the top of the hitch ball, the said securing means being independent of the mounting of the hitch ball on the draft bar, the hitch ball having a threaded shank extending through the draft bar and secured thereto by a nut on the underside of the bar, and the said bight portion being provided with an aperture having a greater diameter than the nut whereby the bight portion may be secured against the underside of the bar with the nut disposed within the aperture.

3. A guard for shielding a trailer hitch ball mounted in upright position on a draft bar at the rear of a draft vehicle comprising, a U-shaped member having a horizontal bight portion connecting a pair of upright guard plates, means for integrally securing the bight portion to the draft bar with the guard plates disposed one on each side of the hitch ball and extending upwardly beyond the top of the hitch ball, the said securing means being independent of the mounting of the hitch ball on the draft bar, and the said bight portion extending crosswise under the draft bar and said securing means comprising a U-bolt having the legs thereof extending downwardly on either side of the draft bar and through apertures in the bight portion of the U-shaped member and being secured therein by nuts against upward removal.

4. A guard for shielding a trailer hitch ball mounted in upright position on a draft bar at the rear of a draft vehicle comprising, a U-shaped member having a horizontal bight portion connecting a pair of upright guard plates, means for integrally securing the bight portion to the draft bar with the guard plates disposed one on each side of the hitch ball and extending upwardly beyond the top of the hitch ball, the said securing means being independent of the mounting of the hitch ball on the draft bar, and the forward edges of the guard plates being inclined upwardly and rearwardly.

* * * * *